United States Patent
Lipscomb et al.

(10) Patent No.: US 7,121,521 B2
(45) Date of Patent: Oct. 17, 2006

(54) SPIGOT

(75) Inventors: Daniel J. Lipscomb, Prairie du Sac, WI (US); Alexander P. Kobryn, Sauk City, WI (US)

(73) Assignee: Fiskars Brands, Inc., Madison, WI (US)

( * ) Notice: Subject to any disclaimer, the term of this patent is extended or adjusted under 35 U.S.C. 154(b) by 59 days.

(21) Appl. No.: 10/812,202

(22) Filed: Mar. 29, 2004

(65) Prior Publication Data

US 2004/0200985 A1 Oct. 14, 2004

Related U.S. Application Data

(60) Provisional application No. 60/461,598, filed on Apr. 8, 2003.

(51) Int. Cl.
*F16L 55/00* (2006.01)

(52) U.S. Cl. ........................................................ 251/8

(58) Field of Classification Search .................... 251/4, 251/7, 8
See application file for complete search history.

(56) References Cited

U.S. PATENT DOCUMENTS

| | | | |
|---|---|---|---|
| 636,971 A * | 11/1899 | Forcier | 251/8 |
| 662,955 A | 12/1900 | McClelland | |
| 1,505,428 A | 8/1924 | Richards et al. | |
| 1,876,988 A | 9/1932 | Lormor | |
| 1,897,743 A | 2/1933 | Warner | |
| 2,070,143 A * | 2/1937 | Schisler | 251/8 |
| 2,212,733 A | 8/1940 | Grigsby | |
| 2,250,122 A | 7/1941 | Bjarnson | |
| 2,680,000 A * | 6/1954 | Pulver | 251/8 |
| 2,796,228 A | 6/1957 | Kelly | |
| 3,042,067 A | 7/1962 | Hidding | |
| 3,043,553 A | 7/1962 | Gorman | |
| 3,332,439 A * | 7/1967 | Burke | 137/556 |
| 3,410,517 A * | 11/1968 | Wall | 251/6 |
| 3,460,797 A | 8/1969 | Allenbaugh, Jr. | |
| 3,626,497 A | 12/1971 | Lambert | |
| 3,693,932 A | 9/1972 | Blohm | |
| 3,754,575 A | 8/1973 | Korhonen-Wesala | |
| 3,770,023 A | 11/1973 | Rink | |
| 3,813,077 A | 5/1974 | Kolic | |
| 3,861,641 A | 1/1975 | Kolic | |
| 3,939,533 A | 2/1976 | Benepe | |
| 3,984,081 A | 10/1976 | Hoganson | |
| 4,053,135 A | 10/1977 | Saliaris | |
| 4,077,601 A | 3/1978 | Dick | |
| 4,091,815 A | 5/1978 | Larsen | |

(Continued)

FOREIGN PATENT DOCUMENTS

EP  0 172 381 A2  2/1986

OTHER PUBLICATIONS

European Search Report dated Jul. 18, 2005, 2 pages.

*Primary Examiner*—J. Casimer Jacyna
(74) *Attorney, Agent, or Firm*—Foley & Lardner LLP

(57) ABSTRACT

An apparatus for regulating a flow of fluid in a tube. The apparatus comprises a housing comprising a passage configured to at least partially receive the tube, an adjustment mechanism rotatably coupled to the housing and selectively configurable between a first position and a second position, and a stopper at least partially provided in the housing and coupled to the adjustment mechanism. The stopper is configured to engage the tube when the adjustment mechanism is rotated from the first position to the second position thereby constricting the tube.

28 Claims, 3 Drawing Sheets

U.S. PATENT DOCUMENTS

| | | |
|---|---|---|
| 4,111,391 A | 9/1978 | Pilolla |
| 4,177,969 A | 12/1979 | Sieber-Muller |
| 4,230,151 A | 10/1980 | Jonsson |
| 4,257,446 A | 3/1981 | Ray |
| 4,262,876 A | 4/1981 | Willatt |
| 4,323,219 A | 4/1982 | Carlin |
| 4,524,944 A | 6/1985 | Sussman |
| 4,569,502 A | 2/1986 | Elliott |
| 4,575,041 A | 3/1986 | Hu |
| 4,576,593 A | 3/1986 | Mommer |
| 4,582,292 A | 4/1986 | Glotzback et al. |
| 4,589,626 A | 5/1986 | Kurtz et al. |
| 4,607,659 A * | 8/1986 | Cole ................ 137/454.2 |
| 4,786,028 A | 11/1988 | Hammond |
| 4,787,406 A | 11/1988 | Edwards et al. |
| 5,026,019 A | 6/1991 | Biekart et al. |
| 5,107,883 A | 4/1992 | Shaw |
| 5,152,497 A | 10/1992 | Bissell |
| 5,190,071 A | 3/1993 | Sule |
| 5,197,708 A * | 3/1993 | Campau ................ 251/8 |
| 5,232,193 A | 8/1993 | Skakoon |
| 5,273,253 A | 12/1993 | Rogers |
| 5,297,526 A * | 3/1994 | Braddock ................ 123/510 |
| 5,351,932 A | 10/1994 | von Herrmann |
| 5,402,823 A | 4/1995 | Cole |
| 5,692,729 A | 12/1997 | Harhen |
| 5,979,840 A | 11/1999 | Hollister et al. |
| 6,234,448 B1 | 5/2001 | Porat |
| 6,340,096 B1 | 1/2002 | Zerfas |

* cited by examiner

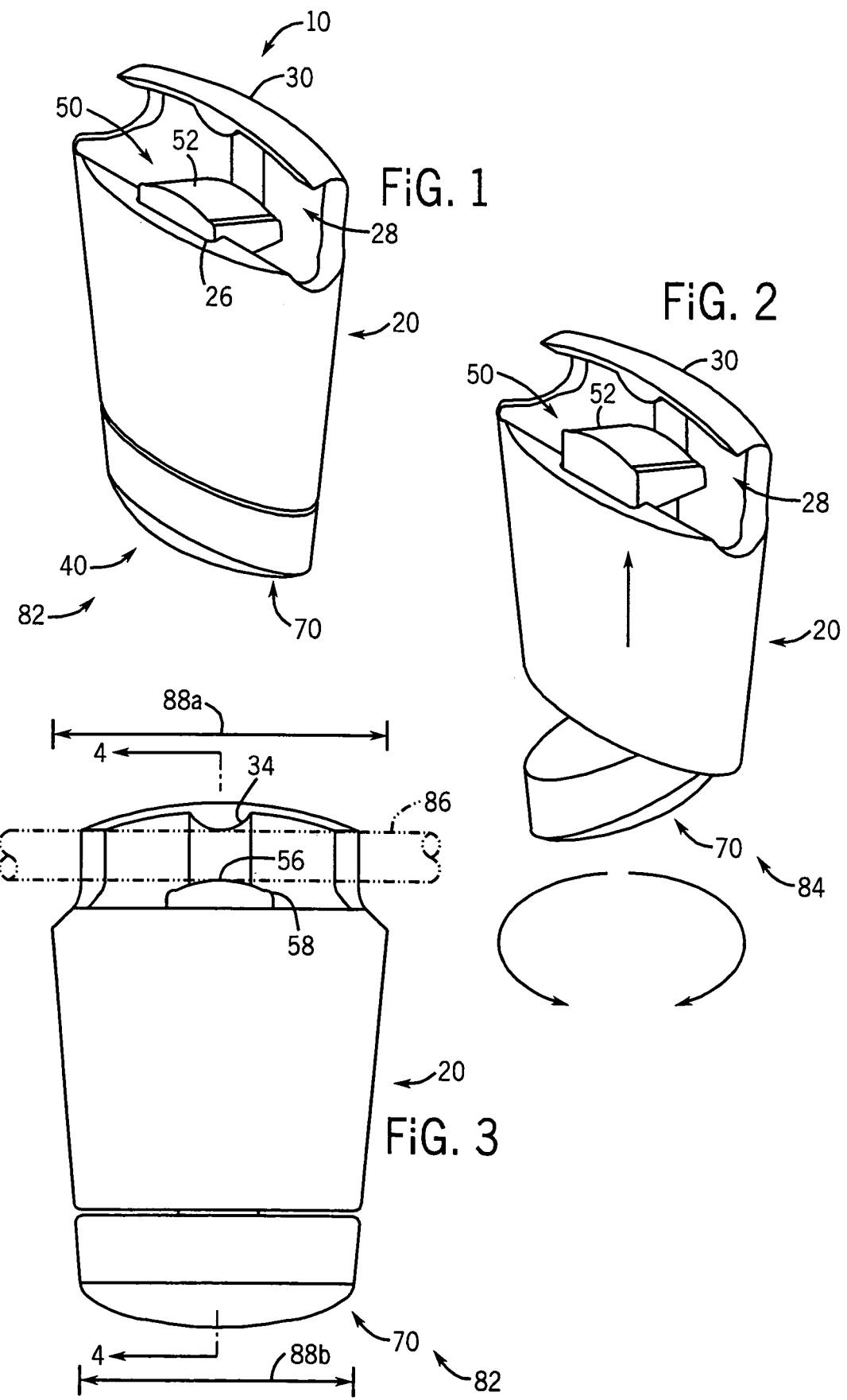

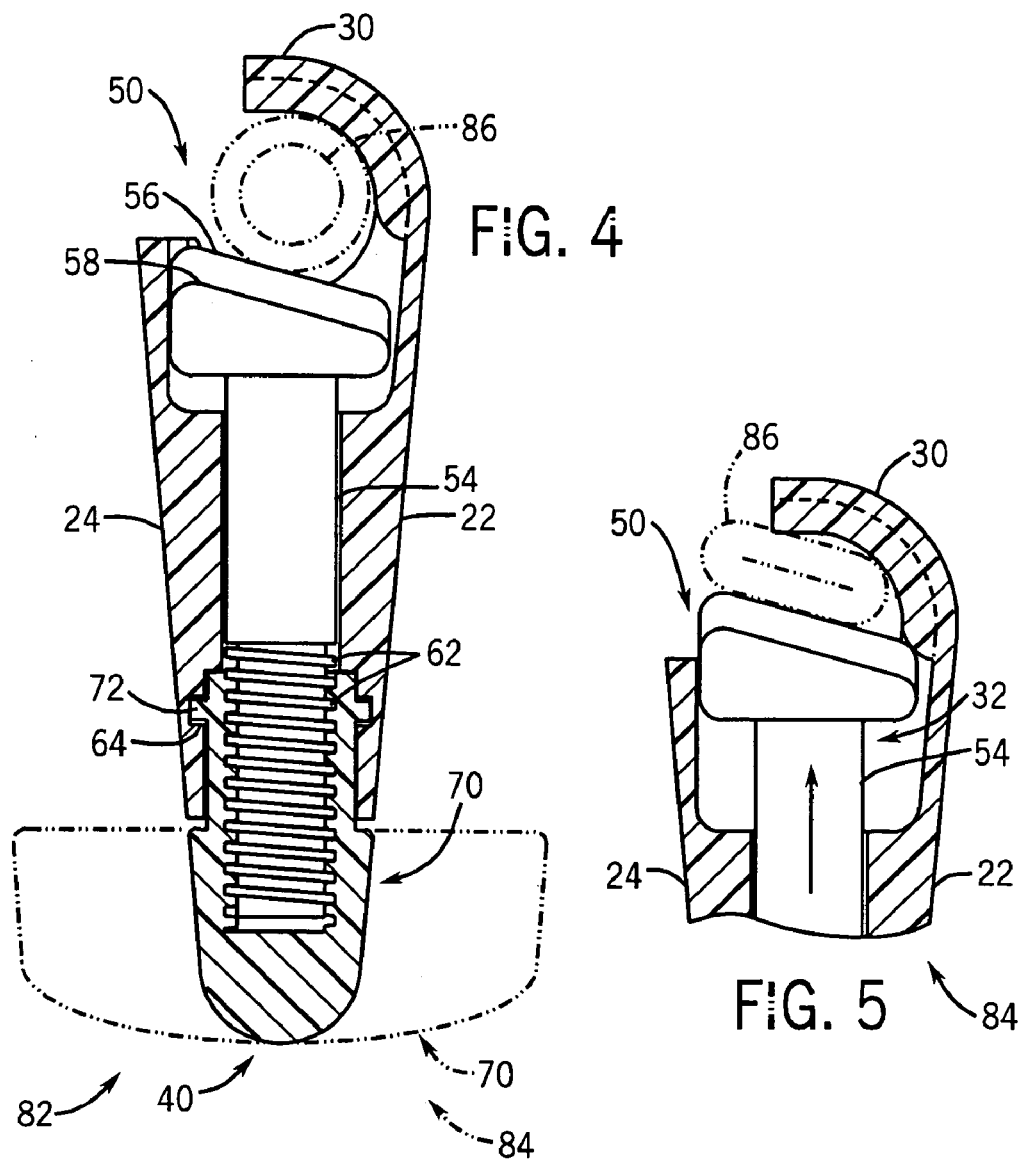
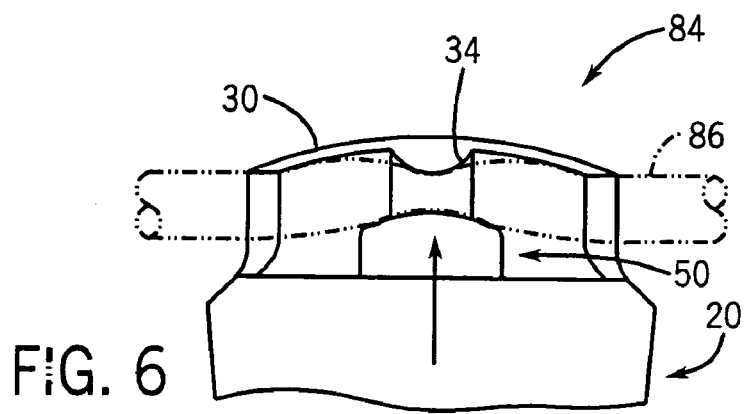

SPIGOT

CROSS-REFERENCE TO RELATED PATENT APPLICATIONS

The present Application claims the benefit of and priority as available under 35 U.S.C. §§ 119–21 to the following U.S. patent applications (which are incorporated by reference in the present Application): U.S. Provisional Patent Application No. 60/461,598 titled "SPIGOT" filed Apr. 8, 2003; U.S. Design patent application Ser. No. 29/179,278 titled "SPIGOT" filed Apr. 8, 2003.

BACKGROUND

The present invention generally relates to spigots. The present invention more specifically relates to a system for regulating the flow of fluid in a hollow elongate member, such as a hose.

It is generally known to provide a sill cock or outdoor faucet for connection to the female end of a garden hose. Water is provided through the hose by turning the sill cock "on." However, such known sill cocks are typically fixed in a location near the water source (e.g., at the exterior of a house), and are not readily accessible when using the "working" or free end of the hose. For example, this can prove to be problematic when attempting to control the flow of water through a water accessory (e.g., sprinkler, nozzle, etc.) provided at the free end of the hose.

Attempts to solve this problem include providing large or bulky portable sill cocks or spigots that enable a user to regulate the flow of water through the hose. Many of these spigots require large tools or great strength to adjust the flow of water. Further, many of these spigots do not provide easily adjusted controls or grips and can often damage the hose when controlling the flow of water.

Accordingly, it would be desirable to provide a spigot that may be located near the free end of a hose for regulating the flow of water in the hose. It would also be desirable to provide a spigot configured for re-positionable attachment along the length of the hose. It would also be desirable to provide a spigot that is easy to use and adjust. It would also be desirable to provide a spigot that allows for selective adjustment of the flow of fluid through a tube such as a hose.

It would be advantageous to provide a spigot or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

SUMMARY

One embodiment of the invention relates to an apparatus for regulating a flow of fluid in a tube. The apparatus comprises a housing comprising a passage configured to at least partially receive the tube, an adjustment mechanism rotatably coupled to the housing and selectively configurable between a first position and a second position, and a stopper at least partially provided in the housing and coupled to the adjustment mechanism. The stopper is configured to engage the tube when the adjustment mechanism is rotated from the first position to the second position thereby constricting the tube.

Another embodiment of the invention relates to an apparatus for controlling a flow of fluid in a hose. The apparatus comprises a body having a channel for at least partially receiving the hose, the channel comprising a curved portion having an inner surface configured to at least partially surround a first portion of the hose. The apparatus comprises a valve rotatably coupled to the body and configured to selectively move between a first position and a second position and a clamp at least partially provided in the body and coupled to the valve, the clamp being configured to control the flow of fluid through the first portion of the hose. The clamp controls the flow of fluid through the first portion of the hose by engaging the hose such that the flow of fluid through the first portion of the hose increases or decreases as the valve is moved between the first position and the second position.

Another embodiment of the invention relates to a method of producing a valve for controlling a flow of fluid in a hose having a diameter. The method comprises providing a valve configured to couple to the hose between a water source and a water accessory, wherein the valve comprises a housing having a passage configured to at least partially receive the hose, the passage comprising a curved portion having an inner surface configured to at least partially surround the hose, an adjustment mechanism rotatably coupled to the housing and selectively configurable between a first position and a second position, and a clamp at least partially provided in the housing and coupled to the adjustment mechanism, wherein the clamp is configured to engage the hose when the adjustment mechanism is rotated from the first position to the second position. The method also comprises configuring the valve to be positionable along a length of the hose so that the housing of the valve at least partially receives the hose, and configuring the valve so that activating the valve changes the diameter of the hose, thereby controlling the flow of fluid in the hose.

BRIEF DESCRIPTION OF THE DRAWINGS

FIG. 1 is a perspective view of a spigot according to a preferred embodiment of the present invention.

FIG. 2 is a perspective view of the spigot of FIG. 1 showing an adjustment mechanism in a use position according to an exemplary embodiment of the present invention.

FIG. 3 is a top plan view of the spigot of FIG. 1.

FIG. 4 is a cross-sectional view of the spigot of FIG. 1 along line 4—4 of FIG. 3.

FIG. 5 is a fragmentary sectional view of the spigot of FIG. 1 showing the adjustment mechanism in the use position according to an exemplary embodiment.

FIG. 6 is a fragmentary top plan view of the spigot of FIG. 1 showing the adjustment mechanism in the use position according to an exemplary embodiment.

DETAILED DESCRIPTION

Figure 7:
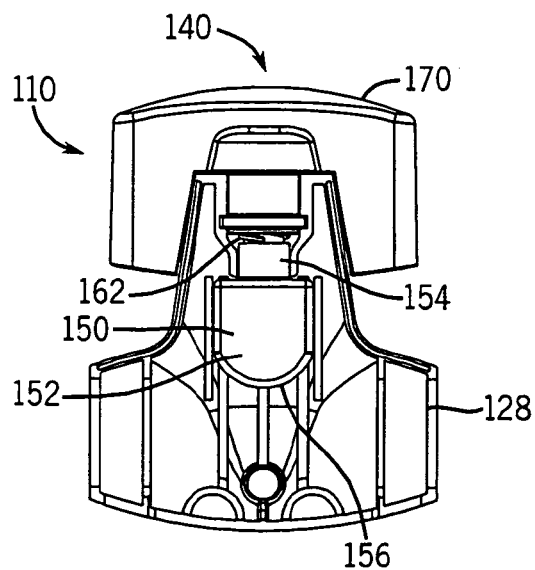
FIG. 7 is a cross-sectional side view of a spigot according to an alternative embodiment.

Before explaining a number of preferred, exemplary, and alternative embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for the purpose of description and should not be regarded as limiting.

A system (shown as a faucet or spigot 10) for regulating the flow of a fluid (such as a liquid or water) in a hollow elongate member or hose 86 is shown in FIG. 1 according to a preferred embodiment. Spigot 10 may be clamped to the exterior wall of hose 86 at a position along the length of hose 86 between a water source or reservoir (such as a sill cock or outdoor faucet) and a free end of the hose 86. For example, spigot 10 may be used to regulate (e.g., control, stop, restrict, slow, increase, etc.) the flow of water through hose 86 before the water reaches a water accessory (such as a hose end or male water outlet, sprinkler, nozzle, etc.) positioned at the free end of hose 86, according to any preferred or alternative embodiments.

Referring to FIG. 1, spigot 10 comprises a housing or body 20 having a channel or passage 28 for receiving hose 86. According to a preferred embodiment as shown in FIG. 3, hose 86 may be positioned in passage 28. A curved ledge or hook 30 at least partially surrounds hose 86. A flange or lip 34 at least partially secures hose 86 in passage 28.

Referring to FIG. 4, spigot 10 also comprises an adjustment mechanism 40, which functions as a valve for regulating the flow of water through hose 86. Adjustment mechanism 40 comprises an actuator (shown as a knob or handle 70) for activating a plunger or ram 50. When adjustment mechanism 40 is in an "off" or non-use position 82, handle 70 is in the same plane or aligned with body 20, and ram 50 is generally disengaged from hose 86 (as shown in FIGS. 1 and 3 according to a preferred embodiment). When adjustment mechanism 40 is in an "on" or use position 84, handle 70 is rotated so that it is off-set from body 20 and ram 50 "pinches" or constricts hose 86 (as shown in FIGS. 2 and 6 according to a preferred embodiment). When adjustment mechanism 40 is in use position 84, the flow of water through hose is restricted so that the water accessory may be reconfigured or changed according to a preferred embodiment as shown in FIG. 6. According to an alternative embodiment, the flow or pressure of the water can be "metered" or adjusted so that there is less than "full" or unimpeded water flow through the hose when adjustment mechanism 40 is between non-use position 82 and use position 84. According to alternative embodiments, the number of rotations of adjustment mechanism 40 between the non-use position 82 and the use position 84 can vary.

Ram 50 comprises a head or wedge (shown as an anvil 52) and a shaft or rod 54. Anvil 52 includes a beveled surface with a curved crown 56 and a flat edge 58 as shown in FIG. 4 according to a preferred embodiment. Anvil 52 is configured to move (e.g., slide back and forth) in a chamber 32 of body 20 as shown in FIG. 5 between a first position and a second position according to a preferred embodiment. Anvil 52 is angled (e.g., downwardly) so that hose 86 is forced toward hook 30 when adjustment mechanism 40 is moved from non-use position 82 to use position 84. When adjustment mechanism 40 is in use position 84, anvil 52 presses hose 86 against an inner surface of hook 30, thereby reducing the diameter of hose 86 and restricting the flow of water through hose 86 (see FIGS. 5 and 6).

A fastener (shown as a screw thread 62) attaches rod 54 to handle 70 as shown in FIG. 4 according to a preferred embodiment. When handle 70 is turned (e.g., tightened in a clockwise direction from non-use position 82 to use position 84), ram 50 is driven toward hook 30 to clamp hose 86. A cutout or guide 26 of body 20 inhibits anvil 52 from pivoting relative to body 20. Handle 70 is press or snap fit at least partially into body 20 by a flange 72, which engages a groove 64 of body 20 (according to a preferred embodiment as shown in FIG. 4).

Body 20 has a generally smooth shape that is "ergonomic" or intended to maximize productivity by reducing operator fatigue and discomfort as shown in FIG. 1 according to a preferred embodiment. Body 20 has generally oblong shape with a relatively planar base 22 and a curved cover 24 according to a preferred embodiment as shown in FIG. 1. Base 22 may facilitate stability of spigot 10 relative to a support surface (e.g., ground, lawn, etc.) and/or provide a surface to grasp when turning handle 70 as shown in FIGS. 2 and 3 according to an alternative embodiment. The shape of body 20 is tapered such that a length 88a of hook 30 is greater than a length 88b of handle 70 as shown in FIG. 3 according to a preferred embodiment. Handle 70 is generally smooth and relatively easy to grasp, thereby facilitating leverage and pivoting relative to body 20 as shown in FIG. 2 according to a preferred embodiment.

According to a particularly preferred embodiment, the handle is about 2.5 inches in length and about 0.6 inches in width. According to a particularly preferred embodiment, the body is about 4 inches in length at the hook.

Figure 8:
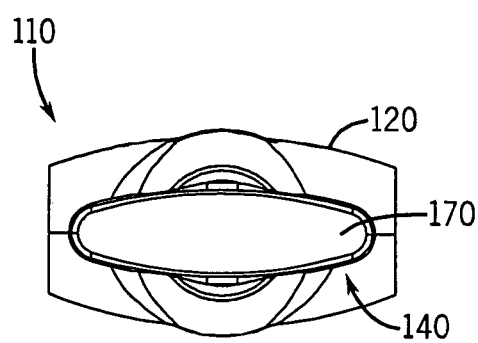
FIG. 8 is a top view of the spigot of FIG. 7 according to an exemplary embodiment.
Figure 9:
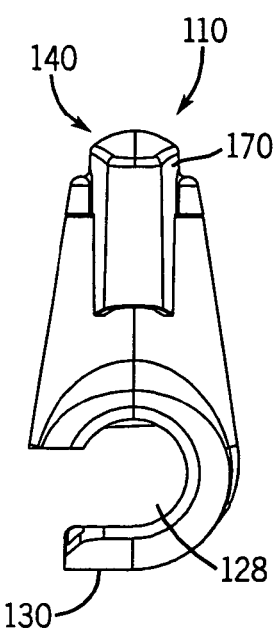
FIG. 9 is a side view of the spigot of FIG. 7 according to an exemplary embodiment.
Figure 10:
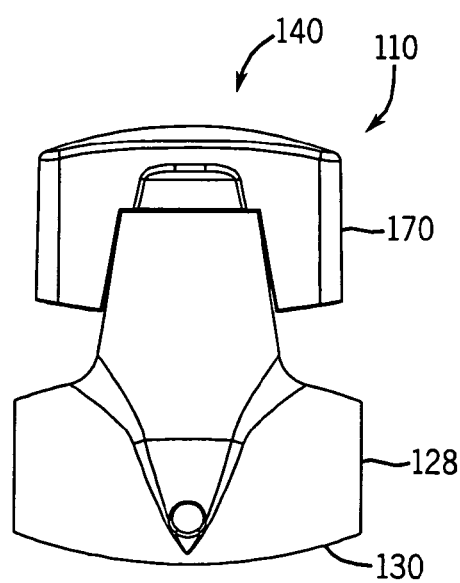
FIG. 10 is a side view of the spigot of FIG. 7 according to an exemplary embodiment.

FIGS. 7–10 show a spigot 110 according to an alternative embodiment. Spigot 110 comprises a housing or body 120 having a channel or passage 128 for receiving a hose. A curved ledge or hook 130 is configured to at least partially surround the hose. Spigot 110 also comprises an adjustment mechanism 140, which functions as a valve for regulating the flow of water through the hose. Adjustment mechanism 140 comprises an actuator (shown as a knob or handle 170) for activating a plunger or ram 150.

Ram 150 comprises a head or wedge 152 and a shaft or rod 154. Wedge 152 includes a curved surface with a crown 156. Wedge 152 is configured to move (e.g., slide back and forth) in a chamber body 120 between a first position and a second position according to a preferred embodiment. A fastener (shown as a screw thread 162) attaches rod 154 to handle 170 according to a preferred embodiment. When handle 170 is turned, ram 150 may be driven toward hook 130 to clamp the hose.

According to various exemplary embodiments, the assemblies and components of the system may be constructed from extruded or injection molded plastic. A variety of plastics may be used for construction or assembly. For example, the spigot may be constructed or assembled from high-impact plastics, polymers, etc. Using plastic offers several advantages including that the pieces may be constructed in a variety of different colors, surface finishes, textures, opacity, etc. According to various alternative embodiments, a variety of other known or suitable materials may be used, including metals, alloys, composites, etc. Various parts of the spigot may be constructed and assembled as a single integrally formed piece or may be constructed and assembled from multiple parts.

It is important to note that the construction and arrangement of the elements of the spigot as shown in the preferred and other exemplary embodiments is illustrative only.

Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter disclosed in this application. For example, according to an alternative embodiment the adjustment mechanism may comprise a cam system to drive the anvil to compress the hose, which may facilitate opening and closing of the valve (i.e., regulation of the flow of water through the hose). According to another embodiment, the passage and/or the anvil may be sized to accommodate a variety of hose diameters. Accordingly, all such modifications are intended to be included within the scope of the present invention. The order or sequence of any process or method steps may be varied or re-sequenced according to alternative embodiments. In any claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions.

What is claimed is:

1. An apparatus for regulating a flow of fluid in a tube, comprising:
    a housing comprising a curved portion extending along an axis of the tube and defining an opening between an end of the curved portion and the housing, the opening providing access to a passage configured to at least partially receive the tube;
    an adjustment mechanism rotatably coupled to the housing and selectively configurable between a first position and a second position; and
    a stopper at least partially provided in the housing and coupled to the adjustment mechanism, the stopper comprising a beveled surface for engaging the tube, the beveled surface being angled so that the tube is urged toward the curved portion;
    wherein the stopper is configured to engage the tube when the tube is placed through the opening into the passage and the adjustment mechanism is rotated from the first position to the second position thereby constricting the tube.

2. The apparatus of claim 1, wherein the curved portion comprises an inner surface configured to at least partially surround the tube.

3. The apparatus of claim 2, wherein the curved portion of the housing comprises a flange extending into the passage for securing the tube in the passage.

4. The apparatus of claim 3, wherein the stopper is configured to constrict the tube by pressing the tube against the flange curved portion.

5. The apparatus of claim 1, wherein the stopper is threadably coupled to a threaded shaft that is threadably coupled to the adjustment mechanism so that rotation of the adjustment mechanism results in movement of the stopper.

6. The apparatus of claim 1, wherein the housing further comprises a guide that prevents the stopper from rotating relative to the housing as the adjustment mechanism is rotated.

7. The apparatus of claim 1, wherein the stopper at least partially restricts the flow of fluid in the tube when the adjustment mechanism is in the first position.

8. The apparatus of claim 7, wherein the flow of fluid in the tube is not restricted by the stopper when the adjustment mechanism is in the second position.

9. The apparatus of claim 1, wherein the flow of fluid in the tube may be varied when the adjustment mechanism is configured between the first position and the second position.

10. The apparatus of claim 1, wherein the housing is configured to at least partially receive a tube at different locations along a length of the tube.

11. The apparatus of claim 10, wherein the housing may be installed on the tube by moving the tube through the opening and into the passage at any one of a plurality of different locations along the length of the tube by a user.

12. The apparatus of claim 1, wherein the stopper is a wedge.

13. The apparatus of claim 1, wherein the tube is a garden hose.

14. The apparatus of claim 1, wherein the housing, adjustment mechanism, and stopper are made from plastic.

15. An apparatus for controlling a flow of fluid in a hose, comprising:
    a body having a channel for at least partially receiving the hose, the channel comprising a curved portion having an inner surface configured to at least partially surround a first portion of the hose and an opening extending along a length of the channel to permit placement of the hose in the channel and removal of the hose from the channel;
    a valve rotatably coupled to the body and configured to selectively move between a first position and a second position; and
    a wedge-shaped clamp at least partially provided in the body and coupled to the valve, the clamp being configured to control the flow of fluid through the first portion of the hose;
    wherein the clamp controls the flow of fluid through the first portion of the hose by engaging the hose such that the flow of fluid through the first portion of the hose increases or decreases as the valve is moved between the first position and the second position.

16. The apparatus of claim 15, wherein the curved portion of the channel comprises a lip for securing the hose in the channel.

17. The apparatus of claim 16, wherein the clamp is configured to compress the hose by pressing the hose against the inner surface of the channel.

18. The apparatus of claim 17, wherein the clamp comprises a surface that is curved so that the hose is urged toward the lip.

19. The apparatus of claim 18, wherein the clamp is threadably coupled to a threaded rod that is threadably coupled to the valve so that rotation of the valve results in movement of the clamp.

20. The apparatus of claim 19, wherein the body further comprises a guide that prevents the clamp from rotating relative to the body as the valve is rotated.

21. The apparatus of claim 15, wherein the clamp at least partially restricts the flow of fluid in the first portion of the hose when the valve is in the first position.

22. The apparatus of claim 15, wherein the body may be re-positioned at different locations along a length of the hose by a user such that the curved portion of the channel at least partially surrounds a second portion of the hose.

23. The apparatus of claim 15, wherein the body may be positioned on the hose between a water source and a water accessory by moving the body in a direction perpendicular to an axis of the hose so that the hose passes through the opening and into the channel.

24. The apparatus of claim 15, wherein the hose comprises a garden hose.

25. A method of producing a valve for controlling a flow of fluid in a hose, comprising:

providing a housing configured to couple to the hose between a water source and a water accessory;

providing a hook extending along the housing to form a passage configured to at least partially receive the hose;

providing an opening coextensive with a length of the passage;

providing an adjustment mechanism rotatably coupled to the housing and selectively configurable between a first position and a second position; and providing a clamp at least partially provided in the housing and coupled to the adjustment mechanism, the clamp having an acutely angled surface configured to engage the hose when the adjustment mechanism is rotated from the first position to the second position.

26. The method of claim 25, further comprising activating the valve by moving the adjustment mechanism provided on the valve between the first position and the second position.

27. The method of claim 26, wherein activating the valve causes the clamp that is coupled to the adjustment mechanism to constrict a diameter of the hose.

28. The method of claim 25, further comprising installing the valve at a location along the length of the hose by moving the hose through the opening and into the passage.

* * * * *